May 13, 1930. T. KASKOURAS 1,758,257
BUTTER DISPENSER AND CUTTER
Filed Sept. 16, 1922 2 Sheets-Sheet 1

Witness

Inventor
Thomas Kaskouras

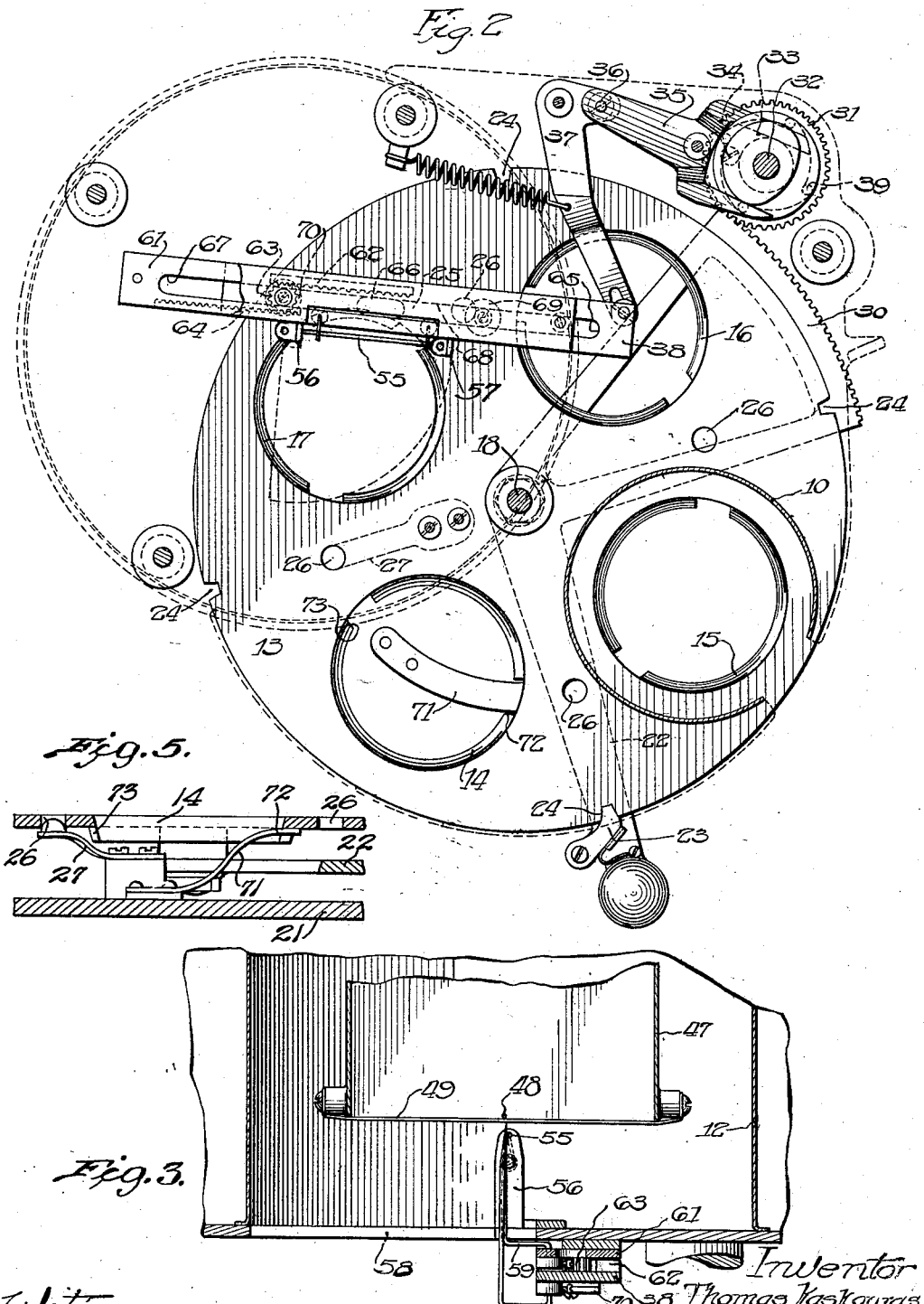

Patented May 13, 1930

1,758,257

UNITED STATES PATENT OFFICE

THOMAS KASKOURAS, OF CHICAGO, ILLINOIS

BUTTER DISPENSER AND CUTTER

Application filed September 16, 1922. Serial No. 588,630.

The invention relates to dispensing machines and particularly to that type which is designed to dispense small portions of butter such as are usually served to guests in hotels and customers in restaurants, and other places where food is served.

The invention has among its various objects the provision of a construction which will receive or accommodate a relatively large piece of butter in the form of a brick the mechanism being operable to divide the brick and sever a piece of the butter so divided from the remainder of the brick.

It is one of the prime objects of the invention to provide a construction which is capable of serving a piece of butter from the brick and which is also constructed so that the severed piece will be deposited upon a dish in which it is served to the guest.

It is a further object of the invention to provide a machine of the character above referred to with a hopper or container in which these dishes are confined and to provide a mechanism whereby said dishes are successively fed from the hopper and positioned to receive the butter as it is cut and severed from the brick.

It is a feature of the invention to provide a construction whereby dishes of various shapes and sizes may be successively fed from the hopper and arranged in a position to receive the butter as it is cut from the mass.

It is an additional object of the invention to employ what might be termed a conveyor operable between the hopper or container for the dishes and the point at which the butter is placed upon the dishes.

It is a further object of the invention to utilize this conveyor to control the discharge of the dishes from the hopper and thereby prevent the accidental discharge of the dishes therefrom.

In addition to the above enumerated object, it is also an object to provide a means for extracting a filled dish from the conveyor so that it will be readily accessible to the person whose duty it is to serve it.

It is a further object of the invention to provide a mechanism for applying pressure upon each actuation of the mechanism to the mass of butter contained in the machine so that it will be continuously fed to the severing and cutting mechanism.

It is an added object of the invention to associate a severing mechanism with the dividing and cutting mechanism above referred to so that a portion of the butter so divided, and cut will be severed and its delivery to the plate arranged below the dividing mechanism insured.

It is one of the fundamental objects of the invention to provide a construction whereby either one or a plurality of pieces of butter may be placed upon a given dish should this at any time be found necessary or desirable.

In the particular structure illustrated in the drawings, a rotatable element is employed, which is arranged below the hopper for the dishes and below the container for the butter. This rotatable element is provided with a plurality of dish receiving elements which are successively moved from a position adjacent the hopper in which the dishes are confined to a position below the container for the butter and subsequently moved from the position below the last mentioned container to a position at which the dish so filled may be extracted from the machine.

A mechanism is employed to extract a dish from the conveyor when the latter is moved to this last named position. A lever and pawl mechanism is employed to engage the rotatable conveyor to actuate it and thereby cause the dish receiving portions of the conveyor to be arranged in cooperative relation to the hopper for the dishes and the container in which the butter is confined. This lever mechanism includes a segmental gear which is arranged to cooperate with and actuate the butter cutting and severing mechanism and to also actuate the mechanism for applying pressure to the mass of butter contained in the container in which the butter is confined.

Upon the disengagement of the pawl carried by this lever from the conveyor it is manifest that the lever may be moved without imparting any movement to the conveyor and therefore one of the dishes carried by the conveyor will be maintained in a position below the butter cutting and severing mechanism, thus the lever and segment carried by the lever may be operated to actuate the pressure applying mechanism and the butter cutting and severing mechanism independently of the conveyor which will allow a number of pieces of butter to be placed upon any one of the dishes which is at this time positioned below the cutting and severing mechanism hereinbefore referred to. The severing mechanism employed includes a pair of reciprocable elements the function thereof being to insure delivery of a portion of the butter after it has been divided and severed from the mass.

The invention will be explained and more readily understood when read in conjunction with the accompanying drawings which illustrate one embodiment of which the invention is susceptible, it being obvious that changes and modifications may be resorted to without departing from the spirit of the appended claims forming a part hereof.

In the drawings Figure 1 is a longitudinal section of a dispensing device constructed according to one embodiment of the invention.

Figure 2 is a sectional view taken on line 2—2 of Figure 1, showing the portion of the butter container in dotted lines.

Figure 3 is a section taken on line 3—3 of Figure 1 looking in the direction of the arrows.

Fig. 5 is a detail sectional view of a portion of the structure with certain parts in elevation.

Figure 1:
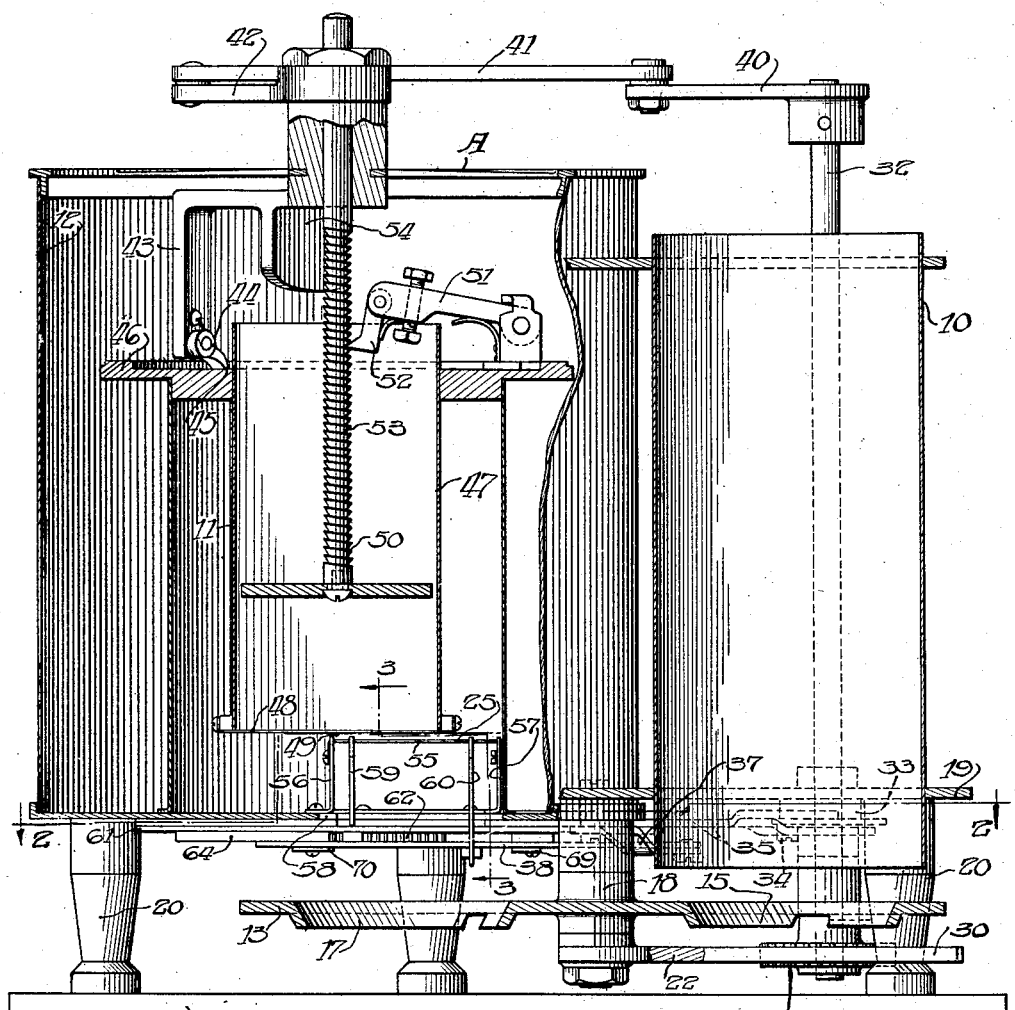
Figure 4:
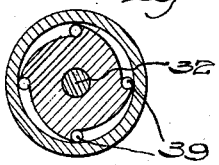
Figure 4 is a detailed view of a clutch employed in the construction.

The particular embodiment of the invention illustrated in the drawings contemplates the use of a dish container or hopper 10, a butter container generally designated 11 and the cooling tank 12, in which a cooling medium for the butter may be confined. A conveyor 13 having the dish receiving orifices 14, 15, 16 and 17, is arranged to rotate below the hopper or dish container 10, and the butter container and cooling tank. These orifices or apertures are conical shaped as clearly shown in Figure 1 and will therefore accommodate dishes which vary both as to their depth and diameters.

The rotatable conveyor 13 is secured by hub 18' to the bottom of the tank 12 and a supporting plate 19 is associated with the hopper 10, the butter container 11 and the cooling tank 12. The entire structure is supported by the legs 20 which are secured to the base 21 and maintain the containers and other mechanism in spaced relation to the base.

A lever 22 is pivotally connected at 18 below the rotatable conveyor and is provided with a spring pressed pawl 23 which is designed to releasably engage one of a plurality of notches 24 provided in the periphery of the conveyor to transmit the motion of the lever to the conveyor and thereby successively rotate said conveyor to arrange one of the orifices of the conveyor in cooperative relation to the hopper 10 and the butter dividing and cutting mechanism generally designated 25, when the conveyor is actuated to locate one of the dish receiving apertures below the hopper 10 the lowermost dish of the stack of dishes will enter the aperture and thus will upon rotation of the conveyor remove said dish from the stack and allow the next or succeeding dish to be engaged by the material of the conveyor between the apertures which will prevent another dish from being fed from the stack until the next aperture is arranged below the container, thus upon each actuation of the conveyor the dishes are caused to be successively fed from the stack.

The conveyor 13 is further provided with a plurality of apertures 26 which as the conveyor is rotated through the medium of the actuation of the lever 22 are respectively brought into engagement with a spring actuated holding mechanism 27, a portion of which is designed to enter one of the apertures 26 and releasibly hold the conveyor against rotation.

The lever mechanism 22 includes a segmental toothed portion 30 which cooperates with the gear 31 carried by the vertical shaft 32. A cam 33 having the downwardly projecting pin 34 is carried by the shaft 32 both of which cooperate with the forked end of a lever 35 which is pivotally connected as at 36 with a bell crank lever 37.

The free end of the bell crank lever 37 is cooperatively connected with a slidable element 38 which is part of the butter severing mechanism generally designated 25. The gear 31 is provided with a ball clutch 39 which is provided to permit this lever mechanism to be moved in a counter clockwise direction without actuating the shaft 32 and to cause the rotation of said shaft when the lever 22 and the segmental toothed portion 30 are moved in a clockwise direction or in other words to a position to permit the pawl 23 to engage a notch such as 24 when it is desired to rotate the conveyor 13 to move a previously filled dish from below the butter container and to extract a dish from the dish container and move it towards the butter cutting and severing mechanism.

It is evident that as the lever 22 and the segmental rack 30 are moved in a clockwise direction, the clutch 39 will engage and cause the rotation of the shaft 32 which will also rotate the lever 40. A link 41 connects the lever 40 with the arm 42 and transmits the motion of the lever 40 to the arms 42 and 43 the latter of which are connected together and supported by the frame A. The arm 43 is provided with a pawl 44 which is designed to engage notches 45 provided at 180° apart from each other in the uppermost face of the disc 46. Thus as the shaft 32 is rotated the arm 43 will have a rotative reciprocable motion imparted to it which is transmitted to the disc 46, to which is secured the butter container 47 in which the mass or brick of butter to be cut is retained.

The lowermost end of the container 47 is provided with the transversely arranged cutting wires 48 and 49 which are provided to divide the butter into equal portions as it is pressed downwardly by the plunger 50. A portion of the means whereby the plunger 50 is actuated in a downward direction includes the lever 51 which is carried by and pivotally secured to the rotatable disc 46 and includes the pawl 52 which engages the notches 53 on the stem of the plunger 50.

This plunger actuating mechanism is operated by the cam 54 carried by the reciprocable arm 43. As before stated the disc 46 and the butter container 47 are rotated a quarter turn upon each actuation of the lever 43 thus the actuating mechanism including the lever 51 will be moved to a position in which it is engageable by the cam 54 to cause its depression, thus at each complete turn of the disc 46 the plunger 50 is moved downwardly a certain predetermined distance forcing the butter downwardly into engagement with the dividing wires 48 and 49.

The severing mechanism 25 hereinbefore referred to is arranged directly below the wires 48 and 49 and includes a butter severing wire 55 the opposite ends of which are secured to the standards or supports 56 and 57, the wire 55 being arranged above an opening 58 provided in the bottom of the receptacle 12 thus it can be seen as the butter is forced downwardly by the plunger 50 it will be divided by the wires 48 and 49 and as the container 47 is rotated by means of the actuation of the arm 43 a portion of the butter so divided will be severed by the wire 55.

It has been found that this portion of the butter which is severed from the remainder, tends to adhere to the cutting wires and therefore a means is provided which is operable to cause the piece of butter cut from the brick to be released from these wires so that it may drop through the aperture 58 upon one of the plates carried by the rotatable conveyor 13 which at this time is arranged below the opening 58 in the bottom of the receptacle 12.

The means for separating the severed butter from the remainder includes a pair of resilient arms 59 and 60 which are mounted to reciprocate lengthwise of the wire 55. These resilient members 59 and 60 travel in close proximity to the wire and pass each other as they travel from one end of the wire to the other, this being permitted by virtue of the fact that these members 59 and 60 are resilient, and thus one will pass over the other, as they contact with each other in their travel from one end of the wire to the other.

The means for causing the reciprocation of these resilient members 59 and 60 includes the cam 33, pin 34, forked lever 35, bell crank lever 37, reciprocable plates 38 and 61, rack 62, pinion 63, and rack 64.

The rack 62 is mounted or carried by the reciprocating plate 38 which is provided with a pair of slotted apertures 65 and 66.

The plate 61 is provided with a pair of similar apertures designated 67 and 68. These plates are mounted upon the underside of the container 12 by means of the elements 69 and 70 which pass through said slots in said plates. One of these elements such as 70 also carries a pinion 63 which engages the racks 62 and 64, and causes the reciprocation of the plate 38 to be transmitted to the other plate 61, and as the resilient members 59 and 60 are respectively carried by the reciprocable plates 38 and 61 said members will be reciprocated upon the movement of the lever mechanism hereinbefore described, which as before stated is actuated by the cam 33 and the pin 34 upon the rotation of the shaft 32.

A means is provided for lifting the dish from one of the apertures 14 to 17 of the conveyor 13 when the dish reaches a certain position in the travel of the conveyor 13. The means illustrated for accomplishing this feature includes a resilient element 71 which has one end secured to the base 21. The opposite or free end of this resilient member 71 is designed to be held in an inoperative position by means of that portion of the rotatable conveyor 13 disposed between the openings 14 to 17, said resilient element being permitted to move upwardly into engagement with an edge of the dish and thereby hold the dish against movement with the rotatable conveyor 13 after its release from engagement with this portion of the rotatable member.

Thus as the conveyor 13 is rotated the dish will be lifted out of the particular aperture in which it is confined and caused to ride upon the upper surface of the turn table from which it may be readily removed from the machine.

To accomplish the above, the downwardly extending flanges of the conical shaped openings 14 to 17 are slotted as indicated at 72 and 73 to permit the resilient element 71 to move into the aperture and into engagement with the dish which is arranged in the aperture when the aperture reaches a certain position in the travel of the conveyor 13.

From the foregoing description it is evident that an arrangement is provided whereby dishes of various sizes may be successively and automatically fed to the conveyor, the latter of which is operable to position said disk below the dividing and severing mechanism, the latter of which is operable to sever the butter after the dish has been arranged below it.

It is further evident that the arrangement permits a dish to be arranged below the dividing and severing mechanism and be retained in this position until the desired number of pieces of butter are deposited upon the dish.

It is also manifest that a means is provided which cooperates with the dividing and cutting mechanism, whereby each piece of butter which is cut from the mass will be positively severed therefrom and caused to be deposited upon the dish.

It is further manifest that the machine is provided with a means for causing the dish so filled to be lifted out of the aperture in which it is confined so that it is more readily accessible to the person whose duty it is to serve it.

Having thus described the invention what I claim and desire to cover by Letters Patent is:

1. In a machine of the character described, the combination of a butter container, butter severing mechanism arranged adjacent the container, a container in which dishes to be filled are confined, means for extracting a dish from said dish container, said means providing means for supporting a dish and being rotatable from the container to the severing mechanism to convey a dish from the container to the severing mechanism and having means for preventing the discharge of a dish from the dish container, said severing mechanism including a stationary cutting member and elements which are movable with respect to said stationary cutting member to free the butter from said stationary cutting member upon the operation of said first mentioned means.

2. In a machine of the character described, the combination of a butter dispensing mechanism having a rotatable butter container, a butter severing mechanism, a container in which a plurality of dishes to be filled are confined, means for extracting a dish from the container, said means being rotatable from the container to the severing mechanism below the rotatable butter container to support and convey a dish from the container to the severing mechanism.

3. In a machine of the character described, the combination of a butter dispensing mechanism having a rotatable butter container, a butter severing mechanism, a container in which a plurality of dishes to be filled are confined, means for extracting a dish from the container, said means being rotatable from the container to the severing mechanism below the rotatable butter container to support and convey a dish from the container to the severing mechanism, said rotatable butter container and butter severing mechanism being operable upon the rotation of the means for extracting a dish from the dish container.

4. In a machine of the character described, the combination of a butter severing mechanism, a container in which dishes to be filled are contained, means movable from the container to the severing mechanism to convey a dish from the container to the severing mechanism, said means having means for extracting a dish from the container and providing a means for controlling the discharge of dishes from the container to said first mentioned means.

5. In a machine of the character described, the combination of a butter severing mechanism, a container in which a plurality of dishes to be filled are confined, means for extracting a dish from the container, said means being rotatable from the container to the severing mechanism to convey a dish from the container to the severing mechanism and having means movable below the dish container for controlling the discharge of the dishes from the container to said means.

6. In a machine of the character described the combination of a butter severing mechanism, a container in which dishes to be filled are contained and means rotatable from the container to the severing mechanism to convey a dish from the container to the severing mechanism, said means being provided with means into which a dish is deposited to allow a dish to be discharged from the container and having means for controlling the discharge of the dishes from the container to said first mentioned means, said last mentioned means being extended from the means into which a dish is deposited to thereby engage and prevent the discharge of a dish from the container.

7. In a machine of the character described, the combination of a butter severing mechanism, a container in which dishes to be filled are contained, a conveyor having means for extracting a dish from said container and providing a means for conveying a dish from the container to the severing mechanism, said conveying means having means for receiving and conveying a plurality of dishes during its movement from the container to the severing mechanism.

8. In a machine of the character described, the combination of a butter severing mechanism, a container in which dishes to be filled are contained, a conveyor having means for extracting a dish from said container and providing a means for conveying a dish from the container to the severing mechanism, said conveying means having means for receiving and conveying a plurality of dishes during its movement from the container to the severing mechanism and providing a means for controlling the discharge of dishes from the container to said extracting means.

9. In a machine of the character described, the combination of a butter severing mechanism, a container in which dishes to be filled are contained, rotatable means having means for extracting a dish from said container and providing a means for conveying a dish from the container to the severing mechanism, said conveying means having means for receiving and conveying a plurality of dishes during its movement from the container to the severing mechanism.

10. In a machine of the character described, the combination of a butter severing mechanism, a container in which dishes to be filled are confined, a conveyor provided to convey dishes from the container to the severing mechanism, said conveyor having means for controlling the feeding of dishes from the container and means for extracting a dish from said conveyor.

11. In a machine of the character described, the combination of a butter severing mechanism, a container in which dishes to be filled are contained, a conveyor provided with means for removing a dish from the container, said conveyor being movable from the container to the severing mechanism and providing a means for conveying a dish from the container to the severing mechanism and means for extracting a dish from said conveyor, said last mentioned means being arranged in the path of movement of a dish and operable to lift a dish relatively to said conveyor.

12. In a machine of the character described, the combination of a butter severing mechanism, a container in which dishes to be filled are confined, means movable from the container to the severing mechanism for extracting and conveying dishes from the container to the severing mechanism and means operable to permit a plurality of pieces of butter to be discharged from the severing mechanism to one of the dishes carried by the conveyor.

13. In a machine of the character described, the combination of a butter severing mechanism, a container in which dishes to be filled are confined, means movable from the container to the severing mechanism, having means for extracting a dish from the container and conveying dishes from the container to the severing mechanism and having means preventing the discharge of dishes from said container, and means whereby the severing mechanism is operable without actuating the conveyor to thereby permit a plurality of pieces of butter to be deposited upon one of the dishes.

14. In a machine of the character described, the combination of a butter container, means for dividing the butter into separate portions, stationary means for severing one of the portions and means movable relatively to the severing means for causing the separating of said last mentioned portion from the adjacent divided portion.

15. In a machine of the character described, the combination of a butter container, means for dividing the butter into separate portions, means for severing one of the portions and means reciprocable with respect to the severing means for causing the release of said last mentioned portion from the adjacent divided portion.

16. In a machine of the character described, the combination of a butter container, means for dividing the butter into separate portions, means for severing one of the portions and means for causing the release of said last mentioned portion from the adjacent divided portion, said means including a pair of reciprocable elements which cooperate with said severing means for separating one portion from the remainder.

17. In a machine of the character described, the combination of a butter container, means for dividing the butter into separate portions, means for severing one of the portions and reciprocable means operable along said second mentioned means for causing the separation of said last mentioned portion from the adjacent divided portion.

18. In a machine of the character described, the combination of a butter container, means for dividing the butter into separate portions, means for severing one of the portions and a pair of reciprocable elements operable along said second mentioned means, for causing the separation of said last mentioned portion from the adjacent divided portion.

19. In a machine of the character described, the combination of a butter dispensing mechanism, a conveyor for dishes and means for actuating the dispensing mechanism and the conveyor when said means is moved in one direction, said means being movable in the opposite direction without causing the actuation of the dispensing mechanism or the conveyor.

20. In a machine of the character described, the combination of a butter dispensing mechanism and a conveyor for dishes, means including a clutch for actuating the conveyor and the dispensing mechanism, said means being operable to cause the actuation of the conveyor and the dispensing mechanism when moved in one direction and movable in the opposite direction without actuating the conveyor or dispensing mechanism.

In witness whereof, I hereunto subscribe my name this 29th day of August A. D., 1922.

THOMAS KASKOURAS.